Jan. 13, 1970  P. L. TISSOT  3,489,271

GLUE PACKAGING

Filed July 22, 1968

INVENTOR:
PIERRE L. TISSOT
BY
Elliott & Pastoriza
ATTORNEYS

United States Patent Office 3,489,271
Patented Jan. 13, 1970

3,489,271
GLUE PACKAGING
Pierre L. Tissot, 863 Via de la Paz,
Pacific Palisades, Calif. 90272
Filed July 22, 1968, Ser. No. 746,330
Int. Cl. B65d 81/32
U.S. Cl. 206—47                             3 Claims

ABSTRACT OF THE DISCLOSURE

A packaging for glue of the epoxy type requiring a resin and catalyst is provided in the form of first and second numbers of small closed rupturable cells containing the resin and catalyst respectively. The cells are of a size corresponding to sugar granules and are held in a suitable container in such a manner that they may be poured from the container. The proper proportion of resin to catalyst can be controlled by the respective numbers of cells containing each of the ingredients or, alternatively, by the actual amount of substance incorporated in each individual cell. Shattering of the mixture cells after application to a surface results in the necessary intimate physical mixing of the resin and catalyst itself to thus provide the desired glue.

---

This invention relates generally to glue products and more particularly to a novel glue packaging arrangement particularly useful for epoxy type glues or cements wherein it is necessary to mix a resin and catalyst immediately prior to use.

BACKGROUND OF THE INVENTION

Epoxy type glues or cements are well known in the art and are normally provided in dual packages which may comprise first and second tubes from which the appropriate resin and catalyst may be expressed. Normally, a given proportion of resin to catalyst must be provided and towards this end the usual practice is to express from the resin tube a given length of the resin and thereafter express from the catalyst tube a proper length of catalyst which, in the event the proportions are 50-50 would be of the same length as the resin. The two substances are then mixed together and applied to work surfaces to be treated with the glue.

The foregoing operation requires a certain amount of work and thought on the part of the user. If the proportions are not correct, or if thorough mixing does not take place, an improper bonding or gluing can result. Accordingly, it has been proposed to provide improved packaging for those types of glues requiring premixing of a resin and hardener or catalyst. These newer types of packaging take the form of a single package having a rupturable diaphragm wherein the resin and catalyst are normally held separated and already provided in proper proportion. In use, the worker will simply knead the package to rupture the diaphragm and effect a thorough mixing of the two ingredients. The contents properly mixed may then be expressed from the overall package to the particular surface to be treated. There is still required, however, physical work on the part of the user and there still exists the chance for error as a consequence of failure to effect a thorough mixing of the ingredients. Also, if there is too much time delay in applying the resulting mixture to the work surface, premature hardening may result and thus make it very difficult to effect the desired gluing operation.

BRIEF DESCRIPTION OF THE PRESENT INVENTION

The present invention comprehends a novel packaging arrangement for epoxy type glues in which the foregoing discussed problems are completely overcome.

More particularly, the packaging in accord with the present invention takes the form of providing a first number of small closed rupturable cells each containing a resin and a second number of small closed rupturable cells each containing a catalyst. The cells are preferably in the form of small hollow spheres all of substantially the same size corresponding approximately to the size of sugar granules.

With the foregoing arrangement, the respective cells may be provided in a suitable container in the form of a mixture of the hollow spheres. This mixture may then be poured from the container in much the same manner as sugar over a surface to be bonded. The cells are then automatically ruptured upon placing two members to be bonded or glued together in intimate contact and upon suitable pressure such that physical mixing of the ingredients of each of the cells takes place. The material of the shattered or ruptured cells itself remains in the glue and adds structural strength thereto.

The proper proportion of resin to catalyst can be achieved by providing a proper proportion of the number of resin cells to the number of catalyst cells in the container. Alternatively, the number of resin and number of catalyst cells may be made exactly even and the cells containing either the resin or catalyst only partially filled in accord with the desired proportion. By providing the respective cells with different colors, the mixture in the packaging will blend to provide a third color indicative of the proper proportions so that a user can tell at a glance if a proper amount of resin and catalyst is present.

BRIEF DESCRIPTION OF THE DRAWINGS

A better understanding of the invention will be had by referring to the preferred embodiment thereof as illustrated in the accompanying drawings in which.

DETAILED DESCRIPTION OF THE PREFERRED EMBODIMENT

Figure 1:
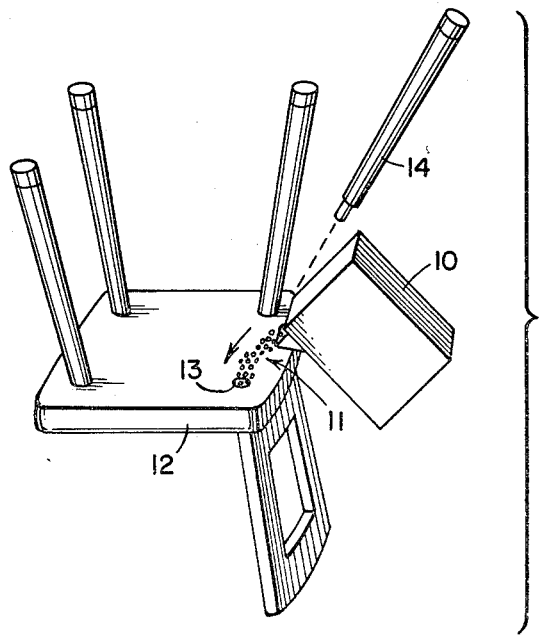
FIGURE 1 is a perspective view illustrating the novel glue packaging arrangement of this invention as it might be used in repairing a chair.

Referring first to FIGURE 1 there is shown a container 10 from which cells in the form of small granules 11 may be poured or otherwise applied to a work. As will become clearer as the description proceeds, some of the cells 11 include a resin material and other of the cells include a catalyst, the various individual cells being mixed together in a desired proportion in the container 10.

In the particular example set forth, the work comprises a chair 12 with a bottom opening 13 for receiving a leg 14 which has become unglued or damaged. In utilizing the glue of the present invention, the granules 11 are poured into the opening 13 and the leg 14 may then be simply urged into the opening thereby rupturing or shattering the various cells so that a proper mixture of the epoxy resin and catalyst takes place.

Figures 2, 3:
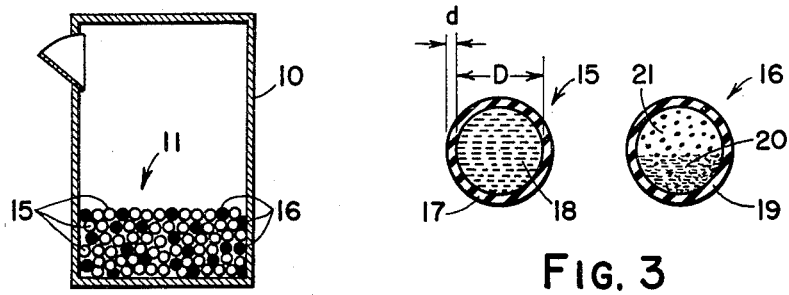
FIGURE 2 is a cross section of the package of FIGURE 1 showing the interior ingredients thereof.
FIGURE 3 is a greatly enlarged view in cross section of individual cells provided in the package of FIGURE 2; and, FIGURE 4 is a fragmentary perspective view illustrating a second manner in which the glue of the present invention may be utilized.

Referring now to FIGURE 2, the individual cells within the container 10 are shown at 15 and 16. A first number of these cells such as the cells 15 incorporate the resin material or substance usually in liquid form. A second number of cells 16 in turn incorporate the catalyst which may also be in a liquid form. As indicated in FIG- URE 2 the first number of cells 15 may be of one color and the second number of cells 16 may be of a different color. When the same are mixed together, the resulting blend will result in a third color indicative of the ratio of the first and second number of cells in the container 10.

In FIGURE 2, the size of the various cells are greatly exaggerated for purposes of clarity.

Referring now to FIGURE 3 there is shown one of the individual cells 15 containing the resin material. As shown, this cell is formed of a rigid plastic material in the shape of a hollow sphere. The plastic material itself is of such a nature that it will not be attacked by the resin liquid incorporated therein. This liquid is indicated at 18. A further characteristic of the plastic skin forming the cell is that it is capable of being shattered under a given impact or pressure. Towards this end, the thickness of the skin material is preferably within the range of from $10^{-4}$ to $10^{-2}$ inches, this dimension being indicated by the letter "$d$". The inside diameter of the cell when formed into a sphere as shown in FIGURE 3 and as indicated at D may be of the order of from $10^{-3}$ to $10^{-1}$ inches.

Referring now to the cell 16 containing the catalyst material as shown in FIGURE 3, the material of the cell comprises a rigid thin plastic 19 formed into a sphere of substantially the same size as the sphere defining the cells 15. In the particular embodiment shown in FIGURE 3, the interior of the cell 19 is only partially filled with catalyst such as indicated at 20. The remaining interior portion may include a suitable filler 21 which is inert. By forming each of the second number of cells 16 in this manner, the number of cells containing resin and the number of cells containing catalyst may be made equal and yet a proportion different from 50–50 may be realized by the partial filling technique described. In the event that the desired proportion is 50–50, the complete interior of the cell 16 would, of course, be filled with the catalyst material.

The desired dimensions $d$ and D are such that the cells approach the size of sugar granules and thus they may be poured readily from the container 10 of FIGURE 2 as described in FIGURE 1. Since the individual cells are dry on their exteriors, the entire mixture within the container is dry and thus easy to handle and pour.

Figure 4:
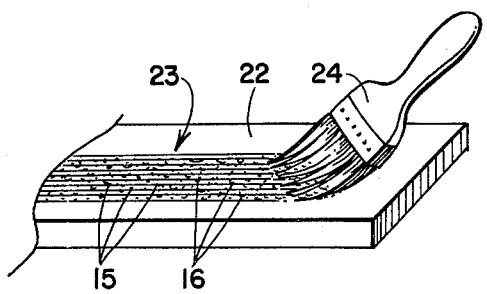

FIGURE 4 illustrates another manner in which the packaged glue of this invention may be utilized. In FIGURE 4, the various individual cells are carried in a liquid medium and thus may be "painted" onto a surface such as the surface 22. The resulting coating is illustrated at 23 and may be applied as shown by a conventional brush 24. The individual cells 15 and 16 will be carried in the medium but will normally remain intact until such time as a second surface is pressed against the coating 23. This action will thus shatter the cells and result in a mixing of the resin and catalyst materials within the cells. In this respect, the material of the cells in the form of the plastic is retained in the final glue as a part of its structure. These remnants will actually add strength to the glue in much the same way that reinforcing steel is employed in concrete.

As an alternative to painting a coating on a surface, the individual cells may be sprayed from a suitable airgun or equivalent apparatus directly onto a surface. The force of this spray may be such as not to actually shatter the cells so that again the cells will remain intact until such time as an actual bond is to be effected by pressing two surfaces together. On the other hand, the force of the spray may be adjusted such that the cells will actually shatter upon impacting the surface and thus the desired mixing will take place and the surface will be immediately ready for application of another surface to be glued or bonded thereto.

OPERATION

Gluing operations with the glue packaging arrangement described can be readily carried out. Thus, in the case of a simple repair such as described in conjunction with FIGURE 1, it is only necessary for a user to pour the cells into the opening and then insert the leg 14 into the opening. The insertion of the leg will result in shattering of the individual cells so that a desired epoxy glue results. There is obviously no mess involved in this operation, the user at all times never being exposed to the actual resin or catalyst material. Moreover, by assuring that proper proportions of resin to catalyst are provided in the container 10, there is no need for the user to concern himself with premixing steps.

In certain other operations, it may be desirable as mentioned in conjunction with FIGURE 4 to package the individual cells in proper proportion in a liquid medium such as any suitable type of vehicle for carrying the granules. As described heretofore, this liquid substance with the granules carried therein may then be painted onto any surface or otherwise applied to the surface as by spraying and the like. In the latter instance of spraying, as mentioned, the force of the spray may be sufficient to shatter the cells resulting in a mixing and hardening of the glue to provide a surface which will outlast any conventional type of paint.

Many other applications will occur to those skilled in the art. The unique manner of packaging glue is therefore not to be thought of as limited to the particular illustrative uses set forth merely by way of example.

What is claimed is:
1. A glue packaging arrangement, comprising:
    (a) a first number of small closed rupturable cells of a first color each containing a resin;
    (b) a second number of small closed rupturable cells of a second color different from said first color each containing a catalyst; and
    (c) a container for holding a mixture of the first and second number, the total amount of resin and total amount of catalyst being in a given proportion indicated by the color resulting from the mixing of said first and second colors to provide a glue upon rupturing of the cells to permit physical mixing together of the respective cells, the respective cells being spherical and having diameters between $10^{-3}$ and $10^{-1}$ inches so that the contents of said container may be poured or otherwise applied onto a work to be treated and the cells subsequently ruptured to form said glue, the ruptured cell material itself remaining in the resulting glue as a part of its final structure.

2. The subject matter of claim 1, in which the cells making up the first and second numbers are all of substantially the same size, the first number being equal to the second number, each of the cells in one of said number of cells being only partially filled to define said given proportion.

3. The subject matter of claim 1, in which the cells making up the first and second numbers are of a material comprising a rigid plastic skin capable of being shattered, said skin having a thickness of from $10^{-4}$ to $10^{-2}$ inches.

References Cited

UNITED STATES PATENTS

| | | | |
|---|---|---|---|
| 2,907,682 | 10/1959 | Eichel | 206—59 |
| 3,266,625 | 8/1966 | Hardman | 206—56 |

MARTHA L. RICE, Primary Examiner